United States Patent
Hassan et al.

(10) Patent No.: US 10,243,484 B2
(45) Date of Patent: Mar. 26, 2019

(54) CURRENT FLOW CONTROL ASSEMBLY

(71) Applicant: General Electric Technology GmbH, Baden (CH)

(72) Inventors: Fainan Anmed Abdul Maguid Mohammed Hassan, Lichfield (GB); Joan Saubassols, Girona (ES); Eduardo Prieto Araujo, Barcelona (ES); Oriol Gomis Bellmunt, Barcelona (ES)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/524,875

(22) PCT Filed: Nov. 7, 2015

(86) PCT No.: PCT/EP2015/075992
§ 371 (c)(1),
(2) Date: May 5, 2017

(87) PCT Pub. No.: WO2016/071522
PCT Pub. Date: May 12, 2016

(65) Prior Publication Data
US 2017/0324247 A1 Nov. 9, 2017

(30) Foreign Application Priority Data
Nov. 7, 2014 (EP) ..................................... 14382445

(51) Int. Cl.
*H02M 7/757* (2006.01)
*H02J 3/36* (2006.01)
(Continued)

(52) U.S. Cl.
CPC .............. *H02M 7/7575* (2013.01); *H02J 3/06* (2013.01); *H02J 3/28* (2013.01); *H02J 3/36* (2013.01); *Y02E 60/60* (2013.01)

(58) Field of Classification Search
CPC ...... H02J 3/36; H02J 3/28; H02J 3/06; H02M 7/7575; H02M 5/458; H02H 7/261; H02H 7/268
(Continued)

(56) References Cited

U.S. PATENT DOCUMENTS

| 2013/0258724 A1 | 10/2013 | Shen et al. | |
| 2015/0049530 A1* | 2/2015 | Trainer | H02M 7/797 363/123 |
| 2015/0180231 A1* | 6/2015 | Whitehouse | H02J 3/36 307/24 |

FOREIGN PATENT DOCUMENTS

| EP | 2 670 013 A1 | 12/2013 |
| WO | 2010115453 A1 | 10/2010 |
| WO | 2013/140168 A1 | 9/2013 |

OTHER PUBLICATIONS

Extended European Search Report and Opinion issued in connection with corresponding EP Application No. 14382445.6 dated Apr. 29, 2015.
(Continued)

*Primary Examiner* — Kyle J Moody
(74) *Attorney, Agent, or Firm* — GE Global Patent Operation; Scott R. Stanley

(57) ABSTRACT

A current flow control assembly, for controlling current flow in an electrical network of interconnected electrical elements, having: current flow controllers, each current flow controller connectable to at least one of the interconnected electrical elements, and being configured to control current flow in at least one of the interconnected electrical elements within a current flow control range; a control unit in com-
(Continued)

munication with each of the current flow controllers, wherein the control unit is configured to: select at least one of the current flow controllers with a flow control range that corresponds to one or more current flow control requirements of the electrical network; and operate the selected current flow controller to control current flow in at least one of the interconnected electrical elements to control current flow in the electrical network in accordance with the current flow control requirement of the electrical network.

10 Claims, 8 Drawing Sheets

(51) Int. Cl.
  *H02J 3/06* (2006.01)
  *H02J 3/28* (2006.01)
(58) Field of Classification Search
  USPC .......................................................... 363/35
  See application file for complete search history.

(56) References Cited

OTHER PUBLICATIONS

International Search Report and Written Opinion issued in connection with corresponding PCT Application No. PCT/EP2015/075992 dated Feb. 8, 2016.
International Preliminary Report on Patentability issued in connection with corresponding PCT Application No. PCT/EP2015/075992 dated May 9, 2017.

* cited by examiner

CURRENT FLOW CONTROL ASSEMBLY

BACKGROUND

An electrical network may include a power source that is connected to a load via one or more current-carrying conductors, or multiple power sources that are connected to multiple loads using a network of current-carrying conductors.

An example of an electrical network is a DC power grid that requires multi-terminal interconnection of HVDC converters, whereby power can be exchanged on the DC side using two or more HVDC converters electrically connected together. Each HVDC converter acts as either a source or sink to maintain the overall input-to-output power balance of the DC power grid whilst exchanging the power as required. The DC power grid relies on a network of DC power transmission lines or cables to achieve multi-terminal interconnection of the HVDC converters.

BRIEF DESCRIPTION

According to a first aspect of the invention, there is provided a current flow control assembly. The assembly is for controlling current flow in an electrical network of a plurality of interconnected electrical elements, comprising: a plurality of current flow controllers, each current flow controller being connectable to at least one of the plurality of interconnected electrical elements, each current flow controller being configured to be operable to selectively control current flow in at least one of the plurality of interconnected electrical elements within a respective current flow control range; a control unit configured to be in communication with each of the plurality of current flow controllers, wherein the control unit is configured to: select at least one of the plurality of current flow controllers with a current flow control range or a combined current flow control range that corresponds to one or more current flow control requirements of the electrical network; and operate the or each selected current flow controller to control current flow in at least one of the plurality of interconnected electrical elements so as to control current flow in the electrical network in accordance with the or each current flow control requirement of the electrical network.

It will be understood that the current flow control assembly may be used with any type of current flow controller that is configurable to be operable to selectively control current flow in one or more electrical elements within a respective current flow control range.

During normal operation of the electrical network, the current flow in each of the plurality of interconnected electrical elements being at a normal operating current level or within a normal operating current range obviates the need to control current flow in the electrical network to apply any corrective action. The electrical network may however experience a change in power flow conditions that in turn may result in the occurrence of an undesirable event, such as electrical transmission congestion, thus requiring said corrective action in order to meet one or more current flow control requirements of the electrical network and thereby restore the electrical network to normal operation.

The configuration of the current flow control assembly according to embodiments of the invention not only permits control of the current flow in the electrical network, but also permits optimisation of the control of the current flow in the electrical network. More specifically, the capability of the control unit to select at least one of the plurality of current flow controllers with a current flow control range or a combined current flow control range that corresponds to one or more current flow control requirements of the electrical network permits distribution of the task of controlling current flow in the electrical network to one or some, instead of all, of the plurality of current flow controllers. This avoids unnecessary operation of a number of current flow controllers that is more than what is required in order to meet one or more current flow control requirements of the electrical network, thus reducing operational losses and thereby improving the efficiency of the current flow control assembly.

In addition the capability of the control unit to select at least one of the plurality of current flow controllers on the basis of its current flow control range or their combined current flow control range means that it is not required for the control unit to have detailed information on the or each type of current flow controller used, thus permitting implementation of the current flow control assembly in a multi-vendor environment.

In embodiments, the control unit may be configured to select at least one of the plurality of current flow controllers with the maximum current flow control range or the maximum combined current flow control range that corresponds to one or more current flow control requirements of the electrical network. Selecting at least one of the plurality of current flow controllers in this manner provides greater flexibility over the control of the current flow in the electrical network due to the wider current variation that can be achieved through the operation of the or each such selected current flow controller.

The respective current flow control range, within which each current flow controller is configured to be operable to selectively control current flow in the at least one of the plurality of interconnected electrical elements, may vary depending on the physical operational limitations of each current flow controller and on the operating conditions of the electrical network to which each current flow controller is connected in use. For example, the respective current flow control range may vary with: power flow conditions in the electrical network; the operating voltage of the or each corresponding electrical element; the operating current of the or each corresponding electrical element; the or each operational voltage limit of the corresponding current flow controller; and/or the or each operational current limit of the corresponding current flow controller.

In further embodiments each current flow controller may be configured to be operable to selectively modify an impedance of the corresponding electrical element or at least one of the corresponding electrical elements so as to control current flow in at least one of the plurality of interconnected electrical elements.

In such embodiments, at least one of the plurality of current flow controllers may include at least one voltage source and may be configured to be operable to selectively inject a voltage drop, in use, into the corresponding electrical element or at least one of the corresponding electrical elements so as to control current flow in at least one of the plurality of interconnected electrical elements.

The inclusion of at least one voltage source in the at least one of the current flow controllers permits injection of a voltage drop into the corresponding electrical element or at least one of the corresponding electrical elements. The injection of a voltage drop into an electrical element creates either a positive resistance effect in which the voltage drop opposes and thereby reduces the current flow in that electrical element, or a negative resistance effect in which the voltage drop contributes to an increase of the current flow in that electrical element. This permits regulation of current flow in the corresponding electrical element or the at least one of the corresponding electrical elements in order to achieve a target current flow in the corresponding electrical element or the at least one of the corresponding electrical elements.

In still further embodiments, the at least one of the plurality of current flow controllers may further include at least one bypass control element arranged to be operable to selectively form a current bypass path to allow, in use, a current in the corresponding current flow controller to bypass the voltage source. This allows a respective current to bypass the voltage source, and thereby results in a configuration of the current flow controller in which the voltage source is inhibited from carrying out regulation of current flow in the corresponding electrical element or the at least one of the corresponding electrical elements.

The interconnectivity between the plurality of electrical elements permits the or each selected current flow controller to directly control current flow in the or each corresponding electrical element but also indirectly control current flow in the or each other electrical element.

The control of current flow in at least one of the plurality of interconnected electrical elements so as to control current flow in the electrical network in accordance with the or each current flow control requirement of the electrical network may be selected from a group of functions including: increasing or decreasing current flow in one or more of the plurality of interconnected electrical elements; limiting current flow in one or more of the plurality of interconnected electrical elements below a predefined current limit; reducing current flow in one or more of the plurality of interconnected electrical elements to zero or substantially zero; balancing the current flows in two or more of the plurality of interconnected electrical elements; reversing current flow in one or more of the plurality of interconnected electrical elements.

The control unit may further include a current detector unit configured to detect a respective current direction in each of the plurality of interconnected electrical elements, wherein the control unit is configured to select at least one of the plurality of current flow controllers with a current flow control range or a combined current flow control range that corresponds to the or each respective current direction in at least one of the plurality of interconnected electrical elements. The provision of the current detector unit provides the control unit with information on the current directions in the plurality of interconnected electrical elements and thereby enables the control unit to take into account such information when selecting at least one of the plurality of current flow controllers with a current flow control range or a combined current flow control range that corresponds to one or more current flow control requirements of the electrical network.

Optionally at least one of the plurality of current flow controllers may be configured to control current flow in the or each corresponding electrical element below a predefined current limit in the event of communication failure with the control unit. This provides the current flow control assembly with a reliable means of ensuring that the electrical network is not exposed to an overcurrent that exceeds the predefined current limit.

According to a second aspect of the invention, there is provided an electrical network comprising: a plurality of interconnected electrical elements; a current flow control assembly according to any embodiment of the first aspect of the invention, each current flow controller being connected to at least one of the plurality of interconnected electrical elements.

It will be appreciated that each electrical element may be any electrical device capable of conducting current. For example, each electrical element may be a power transmission network component, such as a power transmission medium, for example for use in HVDC power transmission.

A power transmission medium may be any medium that is capable of transmitting electrical power between two or more electrical apparatus. Such a medium may be, but is not limited to, a submarine DC power transmission cable, an overhead DC power transmission line or cable and an underground DC power transmission cable. Such an electrical apparatus may be, but is not limited to, a DC power source, a load, or a DC terminal of a DC power grid.

The current flow control assembly and the electrical network according to embodiments of the invention are applicable to low-voltage, medium-voltage and high-voltage applications that involve the transmission of power in an electrical network of a plurality of interconnected electrical elements.

The current flow control assembly and the electrical network according to embodiments of the invention are applicable to different electrical circuits having different numbers of electrical elements, and different topologies of the plurality of interconnected electrical elements. Such an electrical circuit may be, but is not limited to, a mesh-connected DC power grid or a radial-connected DC power grid.

BRIEF DESCRIPTION OF THE DRAWINGS

An embodiment of the invention will now be described, by way of a non-limiting example, with reference to the accompanying drawings in which.

DETAILED DESCRIPTION

Figure 1:
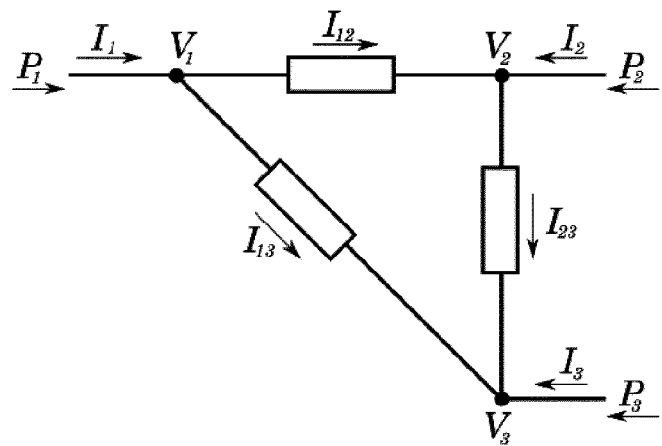
FIG. 1 shows schematically a DC power grid.

A DC power grid is shown in FIG. 1. The DC power grid includes a plurality of grid nodes, and a plurality of DC power transmission lines.

The plurality of grid nodes include first, second and third grid nodes, each of which is connected to a respective converter (not shown). The voltage at the first grid node is $V_1$, the voltage at the second grid node is $V_2$, and the voltage at the third grid node is $V_3$. Each converter is operable to inject power $P_1$, $P_2$, $P_3$ into or extract power $P_1$, $P_2$, $P_3$ from the DC power grid 48. The current flowing to/from the DC power grid from/to the corresponding converter at the first grid node is $I_1$, the current flowing to/from the DC power grid from/to the corresponding converter at the second grid node is $I_2$, and the current flowing to/from the DC power grid from/to the corresponding converter at the third grid node is $I_3$.

The plurality of DC power transmission lines includes a first DC power transmission line, a second DC power transmission line, and a third DC power transmission line. The current flow in the first DC power transmission line is $I_{12}$, the current flow in the second DC power transmission line is $I_{23}$, and the current flow in the third DC power transmission line is $I_{13}$.

The current flow $I_{12}$, $I_{23}$, $I_{13}$ in each DC power transmission line is imposed by the respective voltage drop across each DC power transmission line.

Figure 2:
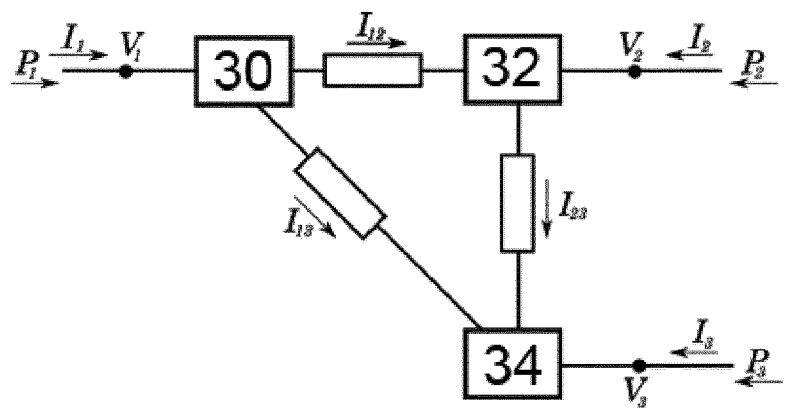
FIG. 2 shows schematically a current flow control assembly according to an embodiment.

FIG. 2 shows schematically the configuration of a current flow control assembly when it is connected in the DC power grid.

The current flow control assembly comprises a plurality of current flow controllers 30,32,34 and a control unit. The plurality of current flow controllers 30,32,34 in the embodiment shown consists of first, second and third current flow controllers 30,32,34. The structure of each current flow controller 30,32,34 is shown schematically in FIG. 3.

Each current flow controller 30,32,34 comprises a plurality of terminals, a pair of bypass control elements in the form of first and second bidirectional switches 36,38, and a voltage source 40 in the form of a controlled capacitor.

The plurality of terminals include first, second and third terminals 42,44,46 that are connectable, in use, to first, second and third electrical elements 48 respectively.

The third terminal 46 is electrically connected to each of the first and second terminals 42,44. More specifically, the first bidirectional switch 36 is operatively connected between the first and third terminals 42,46 and the second bidirectional switch 38 is operatively connected between the second and third terminals 44,46. Hence, each bidirectional switch 36,38 is switchable to selectively permit and block current flow between the third terminal 46 and the corresponding one of the first and second terminals 42,44.

The voltage source 40 is connected between the first and second terminals. The configuration of the bidirectional switches 36,38 and the voltage source 40 in each current flow controller 30,32,34 permits operation of each bidirectional switch 36,38 to selectively form a current bypass path to allow, in use, a current in the corresponding current flow controller 30,32,34 to bypass the voltage source 40.

The first current flow controller 30 is connected at the first grid node. The first terminal 42 of the first current flow controller 30 is connected to a first end of the third DC power transmission line, the second terminal 44 of the first current flow controller 30 is connected to a first end of the first DC power transmission line, and the third terminal 46 is connected directly to the first grid node. As such the first terminal 42 of the first current flow controller 30 is connected to a first electrical element 48 in the form of the third DC power transmission line, the second terminal 44 of the first current flow controller 30 is connected to a second electrical element 48 in the form of the first DC power transmission line, and the third terminal 46 of the first current flow controller 30 is connected to a third electrical element 48 in the form of the first grid node.

The second current flow controller 32 is connected at the second grid node. The first terminal 42 of the second current flow controller 32 is connected to a second end of the first DC power transmission line, the second terminal 44 of the second current flow controller 32 is connected to a first end of the second DC power transmission line, and the third terminal 46 is connected directly to the second grid node. As such the first terminal 42 of the second current flow controller 32 is connected to a first electrical element 48 in the form of the first DC power transmission line, the second terminal 44 of the second current flow controller 32 is connected to a second electrical element 48 in the form of the second DC power transmission line, and the third terminal 46 of the second current flow controller 32 is connected to a third electrical element 48 in the form of the second grid node.

The third current flow controller 34 is connected at the third grid node. The first terminal 42 of the third current flow controller 34 is connected directly to the third grid node, the second terminal 44 of the third current flow controller 34 is connected to a second end of the second DC power transmission line, and the third terminal 46 is connected to the second end of the third DC power transmission line. As such the first terminal 42 of the third current flow controller 34 is connected to a first electrical element 48 in the form of the third grid node, the second terminal 44 of the third current flow controller 34 is connected to a second electrical element 48 in the form of the second DC power transmission line, and the third terminal 46 of the third current flow controller 34 is connected to a third electrical element 48 in the form of the third DC power transmission line.

The above connection of the current flow control assembly permits selective modification of an impedance of at least one of the corresponding electrical elements 48 so as to control current flow in the corresponding electrical elements 48.

The bidirectional switches 36,38 of each current flow controller 30,32,34 can be controlled to switch to a first switched state so as to permit current flow between the first and third terminals 42,46 and to block current flow between the second and third terminals 44,46. This results in a voltage drop, as provided by the voltage source 40, being injected into the second electrical element 48, and thereby results in current being directed through the voltage source 40 between the first and second terminals 42,44.

The bidirectional switches 36,38 can be controlled to switch to a second switched state so as to permit current flow between the second and third terminals 44,46 and to block current flow between the first and third terminals 42,46. This results in a voltage drop, as provided by the voltage source 40, being injected into the first electrical element 48, and thereby results in current being directed through the voltage source 40 between the first and second terminals 42,44.

The bidirectional switches 36,38 of each current flow controller 30,32,34 can be controlled to switch to a third switched state so as to permit current flow between the first and third terminals 42,46 and to permit current flow between the second and third terminals 44,46. This results in the formation of a respective current bypass path between the third terminal 46 and each of the first and second terminals 42,44 to allow, in use, a respective current in the current flow controller 30,32,34 to bypass the voltage source 40. Thus, a voltage drop is not injected into either of the first and second electrical elements 48, and so current is not directed through the voltage source 40 between the first and second terminals 42,44.

Figure 4:
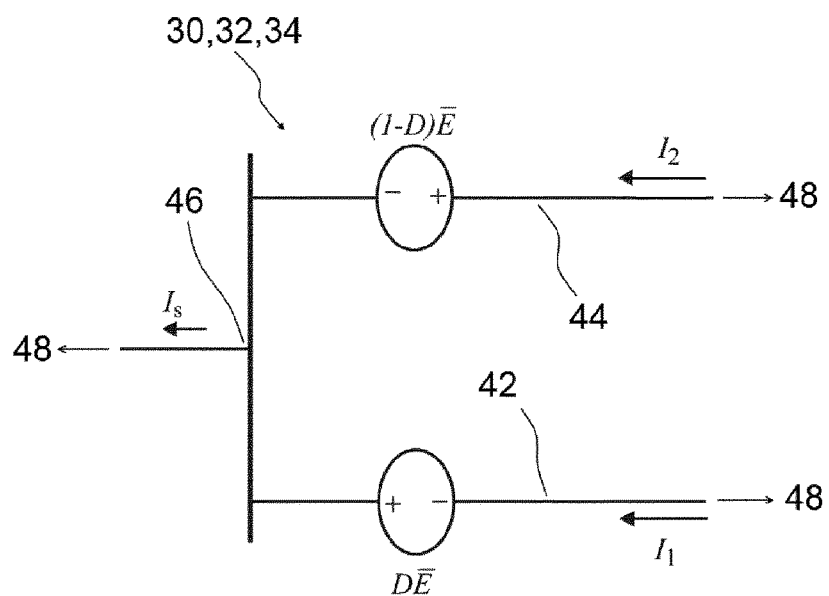

FIG. 4 shows an equivalent model of each current flow controller 30,32,34 in which a first voltage source connected between the first grid node and the third DC power transmission line and by a second voltage source connected between the first grid node and the first DC power transmission line, whereby the first voltage source has a voltage level of D·$\overline{E}$, while the second voltage source has a voltage level of (1−D)·$\overline{E}$, where $\overline{E}$ is the voltage level of the voltage source 40 and D is the duty cycle of the second bidirectional switch 38.

On the basis of the above states of the bidirectional switches 36,38 of each current flow controller 30,32,34, an equivalent model of the current flow control assembly was created in which the operation of the current flow control assembly is represented by:

in respect of the first current flow controller 30, a first voltage source connected between the first grid node and the third DC power transmission line and by a second voltage source connected between the first grid node and the first DC power transmission line;

in respect of the second current flow controller 32, a first voltage source connected between the second grid node and the first DC power transmission line and by a second voltage source connected between the second grid node and the second DC power transmission line; and in respect of the third current flow controller 34, a first voltage source connected between the third grid node and a junction and by a second voltage source connected between the second DC power transmission line and the junction, whereby the junction is further connected to the third DC power transmission line.

Figure 5:
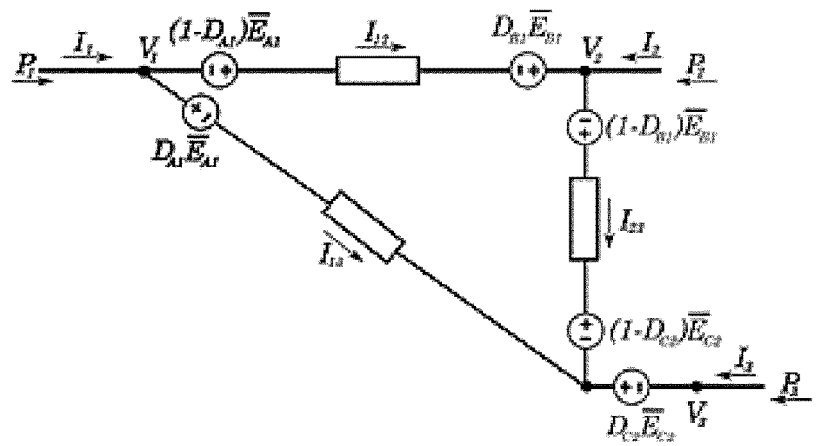
FIG. 5 shows schematically an equivalent model of the current flow control assembly of FIG. 2.

In the equivalent model of the current flow control assembly, each first voltage source has a voltage level of D·$\overline{E}$, while each second voltage source has a voltage level of (1−D)·$\overline{E}$, where $\overline{E}$ is the voltage level of the voltage source 40 and D is the duty cycle of the second bidirectional switch. FIG. 5 shows schematically the equivalent model of the current flow control assembly.

In an embodiment, the injection of a voltage drop into an electrical element 48 creates either a positive resistance effect in which the voltage drop opposes and thereby reduces the current flow in that electrical element 48, or a negative resistance effect in which the voltage drop contributes to an increase of the current flow in that electrical element 48. As such, in respect of each current flow controller 30,32,34, the injection of a voltage drop into a given grid node or DC power transmission line enables modification of the current flows in the DC power grid and thereby permits regulation of current flow in at least one of the electrical elements 48 to be carried out. Such regulation of current flow can be advantageous in that it does not affect the power $P_1$, $P_2$, $P_3$ injected into or extracted from the DC power grid by each converter connected to the respective grid node.

Switching the bidirectional switches 36,38 of a given one of the first, second and third current flow controllers 30,32, 34 to the third switched state allows a respective current to bypass the corresponding voltage source 40, and thereby results in a configuration of the current flow controller in which the voltage source 40 is inhibited from carrying out regulation of current flow in the corresponding electrical elements 48.

The manner of control of current flow in each corresponding electrical element 48 may vary depending on the nature of one or more current flow control requirements of the DC power grid. For example, the control of current flow in each corresponding electrical element 48 so as to control current flow in the electrical network in accordance with one or more current flow control requirements of the DC power grid may be selected from a group of functions including: increasing or decreasing current flow in at least one of the corresponding electrical elements 48; limiting current flow in at least one of the corresponding electrical elements 48 below a predefined current limit; reducing current flow in at least one of the corresponding electrical elements 48 to zero or substantially zero; balancing the current flows in two or more of the corresponding electrical elements 48; reversing current flow in the corresponding electrical element 48 or at least one of the corresponding electrical elements 48.

The interconnectivity between the various grid nodes and DC power transmission lines in the DC power grid permits each current flow controller 30,32,34 to directly control current flow in each corresponding electrical element 48 but also indirectly control current flow in one or more other electrical elements 48. As such, each current flow controller 30,32,34 may be operated to control current flow in one or more of the plurality of interconnected electrical elements 48, instead of only each corresponding electrical element 48, so as to control current flow in the DC power grid.

The configuration of each current flow controller 30,32,34 and the connection of the current flow control assembly in the DC power grid enables each current flow controller 30,32,34 to selectively control current flow in each corresponding electrical element 48 within a respective current flow control range. The respective current flow control range may vary depending on the physical operational limitations of each current flow controller 30,32,34 and on the operating conditions of the DC power grid. For example, the respective current flow control range may vary with: power flow conditions in the DC power grid; the operating voltage of each corresponding electrical element 48; the operating current of each corresponding electrical element 48; the operational voltage limit of the corresponding current flow controller 30,32,34; and/or the operational current limit of the corresponding current flow controller 30,32,34.

The control unit 50 is configured to be in communication with each current flow controller 30,32,34, e.g. by way of fibre-optic cables, and is further configured to selectively control switching of the bidirectional switches 36,38 so as to operate each current flow controller 30,32,34.

Figure 6:
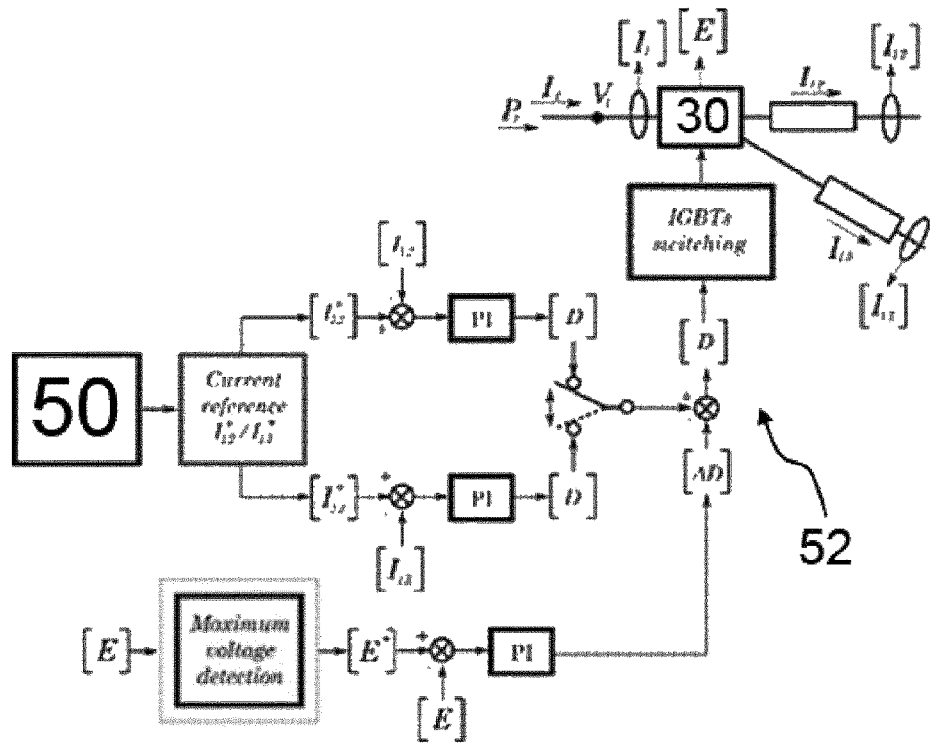
FIG. 6 shows schematically a local control sub-unit for operating a current flow controller.

As shown in FIG. 6, the control unit 50 is configured to provide a current reference to a respective local control sub-unit 52 that in turn is configured to selectively control switching of the bidirectional switches 36,38 so as to operate the corresponding current flow controller 30,32,34. In the event of communication failure with the control unit 50 (e.g. absence of the current reference), each local control sub-unit 52 measures the currents in the DC power transmission lines connected to the corresponding current flow controller 30,32,34, and operates the current flow controller 30,32,34 to control current flow in each corresponding electrical element 48 below a predefined current limit to prevent occurrence of overcurrents. This provides the current flow control assembly with a reliable means of ensuring that the DC power grid is not exposed to an overcurrent that exceeds the predefined current limit.

Each local control sub-unit 52 is also configured to provide the control unit 50 with information on the maximum operational voltage limit of the corresponding voltage source 40.

Operation of the current flow control assembly to control current flow in the DC power grid is described as follows, with reference to FIGS. 7 and 8.

Grid voltage regulation is performed by the converter connected to the first grid node at 400 kV. The power $P_2$ leaving the DC power grid at the second grid node is 400 MW. The power $P_3$ leaving the DC power grid at the third grid node is 300 MW.

During normal operation of the DC power grid, the current flow in the DC power grid is determined by the amount of power flowing through the DC power grid, and is distributed between the DC power transmission lines in accordance with their relative line impedances. At this stage the current flow at or in each of the grid nodes and DC power transmission lines are at a normal operating current level (or within a normal operating current range). This obviates the need to control current flow in the DC power grid to apply any corrective action.

In the event of a change in power flow conditions of the DC power grid, corrective action in the form of current flow control may be required in order to meet one or more current flow control requirements of the DC power grid, such as restoring the current flow in the DC power grid to its normal level or preventing the occurrence of an undesirable event, such as electrical transmission congestion. It will be appreciated that the examples of current flow control requirements provided in this specification is intended to be non-limiting, and that other current flow control requirements may apply.

Using a power flow analysis of the equivalent model shown in FIG. 5, the control unit 50 calculates the respective current flow control range within which each current flow controller 30,32,34 is able to control current flow in each corresponding electrical element 48. It is assumed that the maximum operational voltage limit of each voltage source 40 is set at 4000 V and that current reversal is not permitted to occur in any of the DC power transmission lines.

Figure 7:
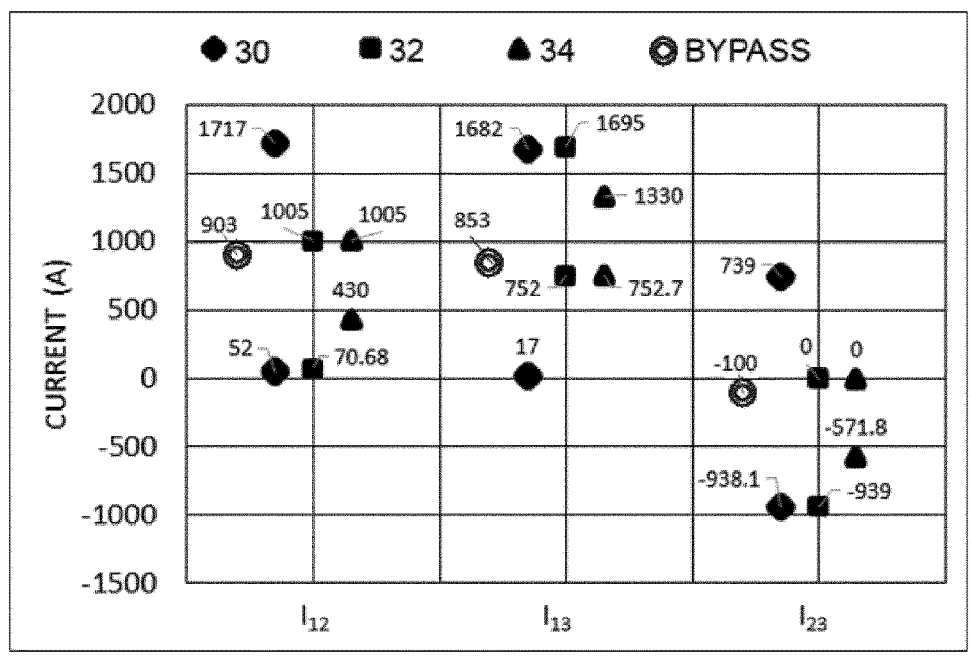
FIGS. 7 and 8 illustrate current flow control ranges and operational voltage limits for a plurality of current flow controllers.

FIG. 7 compares the calculated current flow control ranges with the currents flowing in the DC power transmission lines when the voltage source 40 of each current flow controller 30,32,34 is bypassed.

When the voltage source 40 of each current flow controller 30,32,34 is bypassed, the current $I_{12}$ flowing in the first DC power transmission line is 903 A, the current flowing $I_{23}$ in the second DC power transmission line is −100 A, and the current $I_{13}$ flowing in the third DC transmission line is 853 A.

In respect of the first current flow controller 30, the current flow control range for the first DC power transmission line is 52 A to 1717 A, the current flow control range for the second DC power transmission line is −938.1 A to 739 A, and the current flow control range for the third DC power transmission line is 17 A to 1682 A.

In respect of the second current flow controller 32, the current flow control range for the first DC power transmission line is 70.68 A to 1005 A, the current flow control range for the second DC power transmission line is 752 A to 1695 A, and the current flow control range for the third DC power transmission line is −939 A to 0 A.

In respect of the third current flow controller 34, the current flow control range for the first DC power transmission line is 430 A to 1005 A, the current flow control range for the second DC power transmission line is 752.7 A to 1330 A, and the current flow control range for the third DC power transmission line is −571.8 A to 0 A.

It an be seen from FIG. 7 that each current flow controller 30,32,34 has a current flow control range that corresponds to the current $I_{12}$, $I_{23}$, $I_{13}$ flowing in each DC power transmission line (i.e. the current flow control range corresponds with the current flow control requirements of the DC power grid), and so the control unit 50 can select any one of the first, second and third current flow controllers 30,32,34 for operation to control current flow in one or more of the electrical elements 48 so as to control current flow in the DC power grid in accordance with the current flow control requirements of the DC power grid.

Preferably the control unit 50 selects the current flow controller 30,32,34 with the maximum current flow control range that corresponds to the current flow control requirements of the DC power grid. As shown in FIG. 7, the first current flow controller 30 has the maximum current flow control range. Selecting the current flow controller 30,32,34 with the maximum current flow control range permits wider current variation and thereby provides greater flexibility over the control of the current flow in the DC power grid. If for some reason the first current flow controller 30 is not available for controlling current flow in the DC power grid, the control unit 50 selects another current flow controller 32 with the next highest current flow control range for operation to control current flow in one or more of the electrical elements 48 so as to control current flow in the DC power grid in accordance with the current flow control requirements of the DC power grid.

Figure 8:
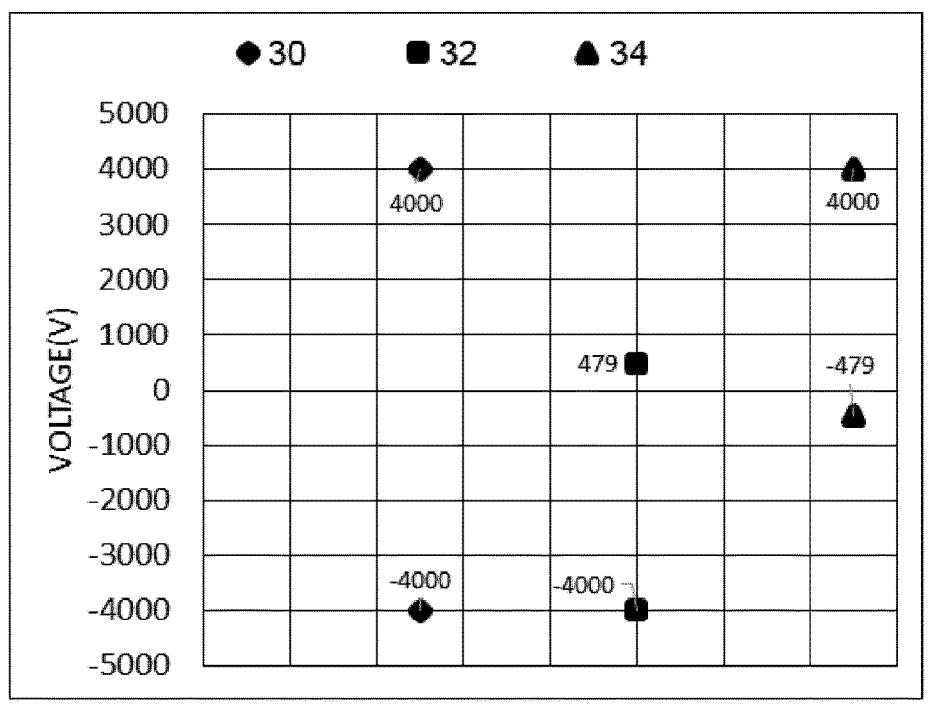

FIG. 8 sets out the operating voltages of each current flow controller 30,32,34 at the limits of the calculated current flow control ranges shown in FIG. 7. It can be seen from FIG. 8 that the first current flow controller 30 reaches its operational voltage limit of 4000 V at both ends of its current flow control range. However, each of the second and third current flow controllers 32,34 do not reach their voltage limits at both ends of the respective current flow control range, because their respective current flow control range is limited by their location in the DC power grid and the associated operating conditions at that location.

Figure 9:
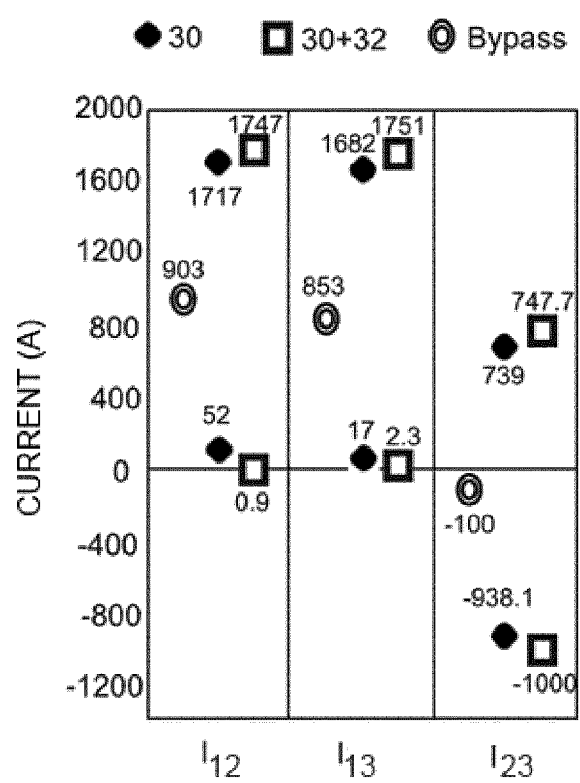
FIG. 9 illustrates the selection of multiple current flow controllers on the basis of their combined current flow control range that corresponds to current flow control requirements of the DC power grid of FIG. 1.

FIG. 9 illustrates the selection of multiple current flow controllers 30,32,34 on the basis of their combined current flow control range that corresponds to current flow control requirements of the DC power grid.

Wen the voltage source 40 of each current flow controller 30,32,34 is bypassed, the current $I_{12}$ flowing in the first DC power transmission line is 903 A, the current flowing $I_{23}$ in the second DC power transmission line is −100 A, and the current $I_{13}$ flowing in the third DC transmission line is 853 A.

A current flow control requirement of the DC power grid may include the reduction of the current $I_{12}$ flowing in the first DC power transmission line to zero or substantially zero, e.g. to take the first DC power transmission line out of service. Reducing the current $I_{12}$ flowing in the first DC power transmission line to zero results in power flowing in a radial path through the second and third DC power transmission lines, whereby the third DC power transmission line carries the maximum system current of 1756 A.

Similarly, another current flow control requirement of the DC power grid may include the reduction of the current $I_{13}$ flowing in the third DC power transmission line to zero or substantially zero, e.g. to take the third DC power transmission line out of service. Reducing the current $I_{13}$ flowing in the third DC power transmission line to zero result in power flowing in a radial path through the first and second DC power transmission lines, whereby the first DC power transmission line carries the maximum system current of 1756 A.

In respect of the first current flow controller 30, the current flow control range for the first DC power transmission line is 52 A to 1717 A, the current flow control range for the second DC power transmission line is −938.1 A to 739 A, and the current flow control range for the third DC power transmission line is 17 A to 1682 A. Thus, the current flow control ranges in respect of the first current flow controller 30 is insufficient to reduce either current $I_{12}$, $I_{13}$ flowing in the first and third DC power transmission lines to zero or substantially zero.

In order to reduce either current $I_{12}$, $I_{13}$ flowing in the first and third DC power transmission lines to zero, multiple current flow controllers 30,32,34 can be selected on the basis of their combined current flow control range to operate in combination. For example, as shown in FIG. 9, operating the first current flow controller 30 at its operational limits in combination with the second current flow controller 32 results in a combined current flow control range that permits reduction of either current $I_{12}$, $I_{13}$ flowing in the first and third DC power transmission lines to 0.9 A and 2.3 A respectively, i.e. substantially zero, which in turn permits operation of line isolators to take the respective DC power transmission line out of service. Thus, the first and third current flow controllers 30,34 have a combined current flow control range that not only corresponds to the currents $I_{12}$, $I_{13}$ flowing in the first and third DC power transmission lines, but also corresponds to the requirement of reducing either current $I_{12}$, $I_{13}$ flowing in the first and third DC power transmission lines to zero.

In his example, the first current flow controller 30 reaches its operational voltage limit of 4000 V at both ends of the combined current flow control range while the second current flow controller reaches an operating voltage of 400 V at one end of the combined current flow control range and −3000 V at the other end of the combined current flow control range.

Once the line isolators have opened the first or third DC power transmission line, the first, second and third current flow controllers 30,32,34 are configured to bypass their respective voltage source 40, with a new power flow balance in the DC power grid in the form of a radial power flow.

The capability of the control unit 50 to select at least one of the plurality of current flow controllers 30,32,34 on the basis of its current flow control range or their combined current flow control range means that it is not required for the control unit 50 to have detailed information on the or each type of current flow controller 30,32,34 used, thus permitting implementation of the current flow control assembly in a multi-vendor environment.

As mentioned above, the current flow control ranges of each current flow controller 30,32,34 may vary with a change in power flow conditions of the DC power grid.

In each of the following examples, grid voltage regulation is performed by the converter connected to the first grid node at 400 kV.

When the DC power grid is configured such that the power $P_1$ leaving the DC power grid at the first grid node is 700 MW, the power $P_2$ entering the DC power grid at the second grid node is 400 MW and the power $P_3$ entering the DC power grid at the third grid node is 300 MW, the first current flow controller 30 has the maximum current flow control range out of the plurality of current flow controllers 30,32,34.

When the DC power grid is configured such that the power $P_1$ leaving the DC power grid at the first grid node is 100 MW, the power $P_2$ entering the DC power grid at the second grid node is 400 MW and the power $P_3$ leaving the DC power grid at the third grid node is 300 MW, the second current flow controller 32 has the maximum current flow control range out of the plurality of current flow controllers 30,32,34.

When the DC power grid is configured such that the power $P_1$ entering the DC power grid at the first grid node is 100 MW, the power $P_2$ leaving the DC power grid at the second grid node is 400 MW and the power $P_3$ entering the DC power grid at the third grid node is 300 MW, the second current flow controller 32 has the maximum current flow control range out of the plurality of current flow controllers 30,32,34.

When the DC power grid is configured such that the power $P_1$ leaving the DC power grid at the first grid node is −800 MW, the power $P_2$ entering the DC power grid at the second grid node is 600 MW and the power $P_3$ entering the DC power grid at the third grid node is 200 MW, the first current flow controller 30 has the maximum current flow control range out of the plurality of current flow controllers 30,32,34.

Consequently a change in power flow conditions of the DC power grid can lead to the selection of a different current flow controller 30,32,34 for controlling current flow in the DC power grid.

The configuration of the current flow control assembly of FIG. 2 therefore not only permits control of the current flow in the DC power grid, but also permits optimisation of the control of the current flow in the DC power grid. More specifically, the capability of the control unit 50 to select at least one of the plurality of current flow controllers 30,32,34 with a current flow control range or a combined current flow control range that corresponds to one or more current flow control requirements of the DC power grid permits distribution of the task of controlling current flow in the electrical network to one or some, instead of all, of the plurality of current flow controllers 30,32,34. This avoids unnecessary operation of a number of current flow controllers 30,32,34 that is more than what is required in order to meet one or more current flow control requirements of the DC power grid, thus reducing operational losses and thereby improving the efficiency of the current flow control assembly.

In embodiments of the invention, it is envisaged that the configuration of each current flow controller assembly may vary. For example, the number of voltage sources and bypass control elements in a given current flow controller may vary so long as the current flow controller is operable to inject a voltage drop into a corresponding electrical element and to bypass the or each voltage source. For example, one or more additional switches may be connected with the voltage source between the first and second terminals to permit switching of the voltage source into and out of circuit between the first and second terminals.

Figure 10:
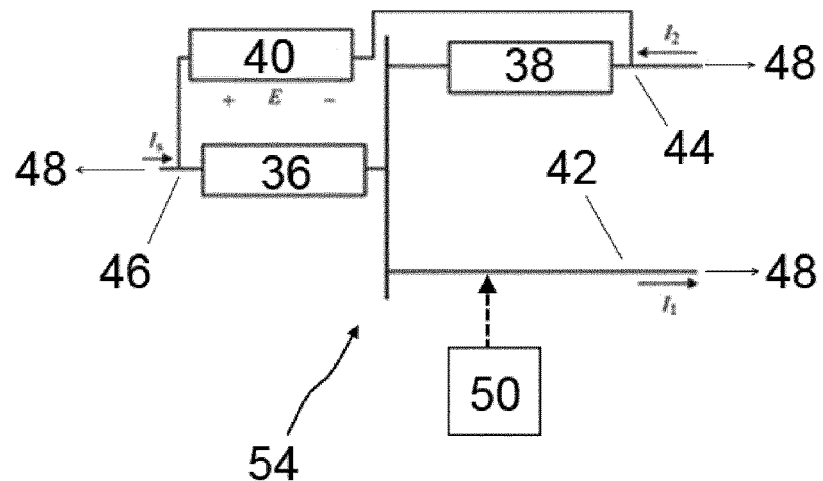
FIGS. 10 and 11 show schematically a current flow controller variant and its equivalent model respectively.
Figure 11:
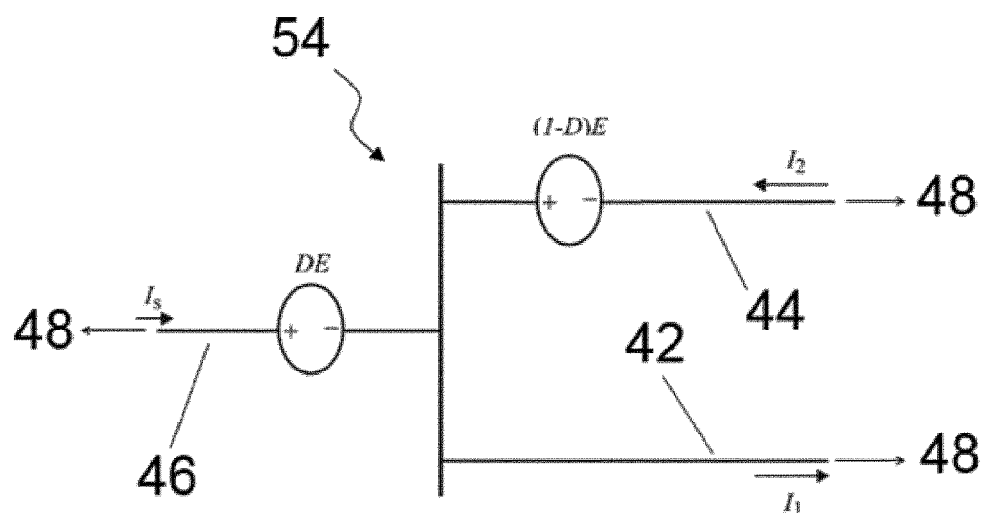

FIGS. 10 and 11 show schematically a variant 54 of the current flow controller 30,32,34. The variant 54 is similar in structure and operation to the current flow controller 30,32,34 of FIGS. 3 and 4, and like features share the same reference numerals.

Figure 3:
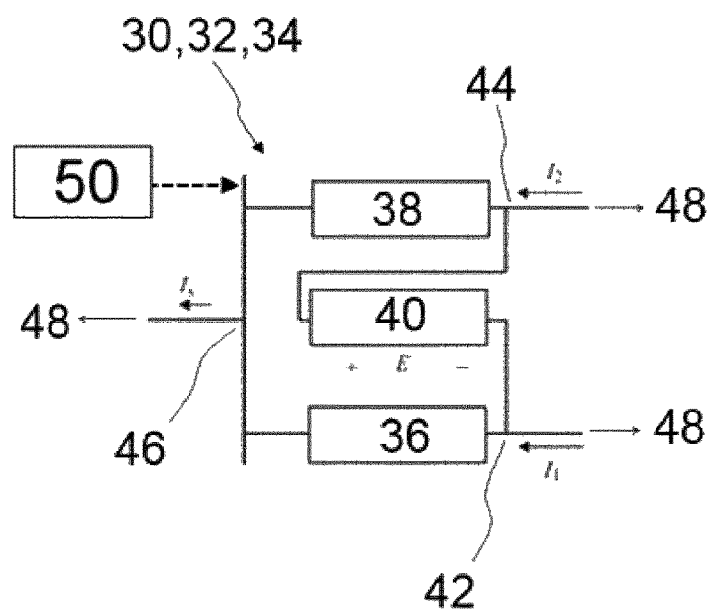
FIGS. 3 and 4 show schematically a current flow controller and its equivalent model respectively.

The variant 54 differs from the current flow controller 30,32,34 of FIGS. 3 and 4 in that, in the variant: the first bidirectional switch 36 is operatively connected between the first and third terminals 42,46; the second bidirectional switch 38 is operatively connected between the first and second terminals 42,44; and the voltage source 40 is connected between the second and third terminals 44,46.

The bidirectional switches 36,38 of the variant 54 can be controlled to switch to a first switched state so as to permit current flow between the first and third terminals 42,46 and to block current flow between the first and second terminals 42,44. This results in a voltage drop, as provided by the voltage source 40, being injected into the second electrical element 48, and thereby results in current being directed through the voltage source 40 between the second and third terminals 44,46.

The bidirectional switches 36,38 of the variant 54 can be controlled to switch to a second switched state so as to permit current flow between the first and second terminals 42,44 and to block current flow between the first and third terminals 42,46. This results in a voltage drop, as provided by the voltage source 40, being injected into the third electrical element 48, and thereby results in current being directed through the voltage source 40 between the second and third terminals 44,46.

The bidirectional switches 36,38 of the variant 54 can be controlled to switch to a third switched state so as to permit current flow between the first and second terminals 42,44 and to permit current flow between the first and third terminals 42,46. This results in the formation of a respective current bypass path between the first terminal 42 and each of the second and third terminals 44,46 to allow, in use, a respective current in the variant 54 to bypass the voltage source 40. Thus, a voltage drop is not injected into either of the second and third electrical elements 48, and so current is not directed through the voltage source 40 between the second and third terminals 44,46.

It will be appreciated that the configuration of the current flow control assembly shown in FIG. 2 is merely chosen to illustrate the working of an embodiment of the invention, and that the current flow control assembly may be configured in different ways when connected in the DC power grid. For example, with reference to FIG. 2, the current flow control assembly may include only two of the three current flow controllers 30,32,34, instead of all three current flow controllers 30,32,34.

Figure 12:
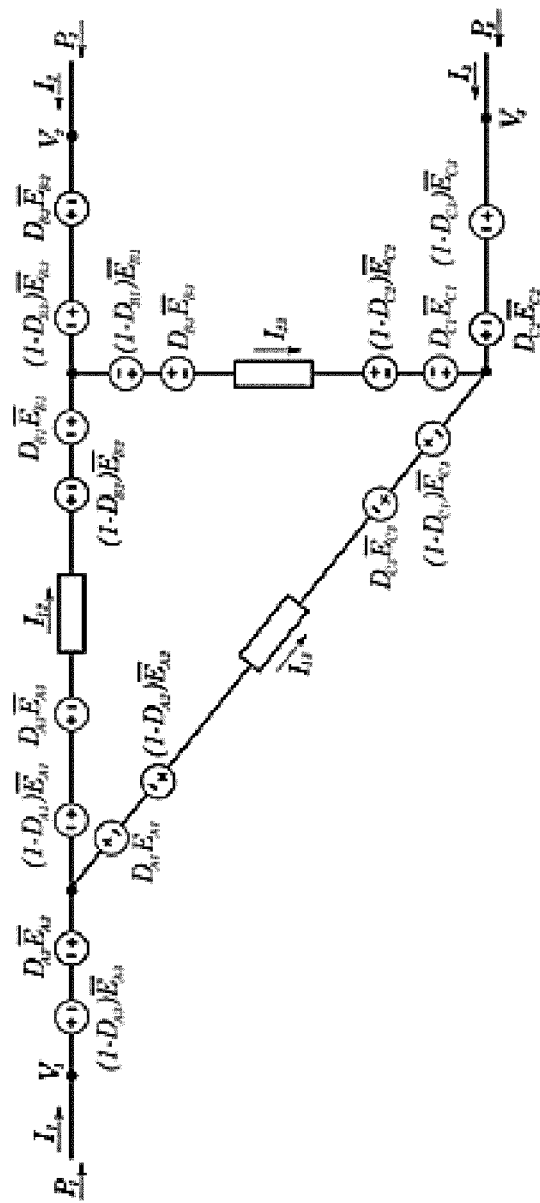
FIG. 12 shows schematically an equivalent model of a current flow control assembly variant.

FIG. 12 shows an equivalent model of a current flow control assembly variant in which each current flow controller connected at each grid node is configured to be capable of selectively injecting both positive and negative voltage drops, in use, into each of the corresponding electrical elements (i.e. the associated grid note and DC power transmission lines) so as to control current flow in the or each corresponding electrical element. Such a current flow control assembly may be used in a DC power grid with highly dynamic power flow conditions.

It follows that, in a DC power grid with lower dynamic power flow conditions, the configuration of the current flow control assembly can be simplified by reducing the number of current flow controllers and/or reducing the voltage drop injection capability of one or more current flow controllers (e.g. configuring a given current flow controller to be able to inject only a positive or negative voltage drop and/or to be able to inject a voltage drop into a fewer number of electrical elements).

The control unit 50 may further include a current detector unit (which may include a plurality of current sensors) configured to detect a respective current direction in each of the plurality of interconnected electrical elements, wherein the control unit is configured to select at least one of the plurality of current flow controllers with a current flow control range or a combined current flow control range that corresponds to the or each respective current direction in the or each corresponding electrical element. The provision of the current detector unit provides the control unit with information on the current directions in the plurality of interconnected electrical elements and thereby enables the control unit to take into account such information when selecting at least one of the plurality of current flow controllers with a current flow control range or a combined current flow control range that corresponds to one or more current flow control requirements of the DC power grid.

As such, for a given set of current directions in each of the plurality of interconnected electrical elements 48, the equivalent model shown in FIG. 12 can be reduced to the equivalent model shown in FIG. 5.

It will be also appreciated that the topology of the DC power grid of FIG. 1 was merely chosen to help illustrate the working of the current flow control assembly according to embodiments of the invention, and that the current flow control assembly according to embodiments of the invention is applicable to other DC power grid topologies and also to other types of electrical circuits.

What is claimed is:

1. A current flow control assembly, comprising:
a plurality of current flow controllers, each current flow controller connectable to at least one of a plurality of interconnected electrical elements, each current flow controller being configured to be operable to selectively control a current flow in at least one of the plurality of interconnected electrical elements within a respective current flow control range;
a control unit configured to be in communication with each of the plurality of current flow controllers,
wherein the control unit is configured to:
select at least one of the plurality of current flow controllers with a current flow control range or a combined current flow control range that corresponds to one or more current flow control requirements of an electrical network; and
operate the or each selected current flow controller to control current flow in at least one of the plurality of interconnected electrical elements so as to control current flow in the electrical network in accordance with the or each current flow control requirement of the electrical network; and
wherein the respective current flow control range varies with the or each operational voltage limit of the corresponding current flow controller, and/or the or each operational current limit of the corresponding current flow controller.

2. The current flow control assembly according to claim 1, wherein the control unit is configured to select at least one of the plurality of current flow controllers with a maximum current flow control range or a maximum combined current flow control range that corresponds to one or more current flow control requirements of the electrical network.

3. The current flow control assembly according to claim 1, wherein the respective current flow control range varies with:
power flow conditions in the electrical network;
the operating voltage of the or each corresponding electrical element; and/or
the operating current of the or each corresponding electrical element.

4. The current flow control assembly according to claim 1, wherein each current flow controller is configured to be operable to selectively modify an impedance of a corresponding interconnected electrical element of the plurality of interconnected electrical elements so as to control current flow in at least one of the plurality of interconnected electrical elements.

5. The current flow control assembly according to claim 4, wherein at least one of the plurality of current flow controllers includes at least one voltage source and is configured to be operable to selectively inject a voltage drop, in use, into the corresponding electrical element or at least one of the corresponding electrical elements so as to control current flow in at least one of the plurality of interconnected electrical elements.

6. The current flow control assembly according to claim 5, wherein the at least one of the plurality of current flow controllers further includes at least one bypass control element arranged to be operable to selectively form a current bypass path to allow, in use, a current in the corresponding current flow controller to bypass the voltage source.

7. The current flow control assembly according to claim 1, wherein the control of current flow in at least one of the plurality of interconnected electrical elements controls current flow in the electrical network in accordance with the or each current flow control requirement of the electrical network is selected from a group of functions consisting of:
increasing or decreasing current flow in one or more of the plurality of interconnected electrical elements;
limiting current flow in one or more of the plurality of interconnected electrical elements below a predefined current limit;
reducing current flow in one or more of the plurality of interconnected electrical elements to zero or substantially zero;
balancing the current flows in two or more of the plurality of interconnected electrical elements;
reversing current flow in one or more of the plurality of interconnected electrical elements.

8. The current flow control assembly according to claim 1, wherein the control unit further includes a current detector unit configured to detect a respective current direction in each of the plurality of interconnected electrical elements, wherein the control unit is configured to select at least one of the plurality of current flow controllers with a current flow control range or a combined current flow control range that corresponds to the respective current direction in at least one of the plurality of interconnected electrical elements.

9. The current flow control assembly according to claim 1, wherein at least one of the plurality of current flow controllers is configured to control current flow in a corresponding interconnected electrical element of the plurality of interconnected electrical elements below a predefined current limit in the event of communication failure with the control unit.

10. An electrical network comprising:
a plurality of interconnected electrical elements; and
a current flow control assembly, comprising:
a plurality of current flow controllers, each current flow controller connectable to at least one of the plurality of interconnected electrical elements, each current flow controller being configured to be operable to selectively control a current flow in at least one of the plurality of interconnected electrical elements within a respective current flow control range;
a control unit configured to be in communication with each of the plurality of current flow controllers,
wherein the control unit is configured to:
select at least one of the plurality of current flow controllers with a current flow control range or a combined current flow control range that corresponds to one or more current flow control requirements of an electrical network; and
operate the or each selected current flow controller to control current flow in at least one of the plurality of interconnected electrical elements so as to control current flow in the electrical network in accordance with the or each current flow control requirement of the electrical network; and
wherein the respective current flow control range varies with the or each operational voltage limit of the corresponding current flow controller, and/or the or each operational current limit of the corresponding current flow controller.

* * * * *